United States Patent

Usry

[15] 3,647,176

[45] Mar. 7, 1972

[54] CAVITATING THROTTLING VALVE

[72] Inventor: Joe D. Usry, Arlington, Tex.

[73] Assignee: LTV Electrosystems, Inc., Greenville, Tex.

[22] Filed: June 23, 1970

[21] Appl. No.: 49,048

[52] U.S. Cl.........................................................251/122
[51] Int. Cl.......................................................F16k 47/00
[58] Field of Search..............251/48, 121, 122, 205; 138/45, 138/46

[56] References Cited

UNITED STATES PATENTS

| 1,921,761 | 8/1933 | Leins | 251/122 |
| 1,980,752 | 11/1934 | Eskilson et al. | 251/DIG. 4 |
| 3,013,767 | 12/1961 | DeHaven | 251/122 |
| 3,317,184 | 5/1967 | Usry | 251/122 |

*Primary Examiner*—Henry T. Klinksiek
*Attorney*—Richards, Harris & Hubbard

[57] ABSTRACT

To provide a definable and repeatable transition between noncavitating and cavitating flow in a variable area venturi valve, a flow straightener is included upstream of a valve seat and metering plug assembly. Cavitating venturi valves meter the flow of fluid therethrough between the metering plug and the valve seat. The metering plug and the valve seat have a geometry that in cross section resembles a venturi. The valve straightener resembles a plurality of parallel passageways having a length to width ratio to collimate a flow of fluid passing therethrough.

6 Claims, 5 Drawing Figures

INVENTOR:
JOE D. USRY

Richards, Harris & Hubbard
ATTORNEYS

INVENTOR:
JOE D. USRY

Richards, Harris & Hubbard
ATTORNEYS

CAVITATING THROTTLING VALVE

This invention relates to a cavitating venturi valve, and more particularly to a cavitating venturi valve including a collimator for producing less turbulent flow through the metering orifice.

Heretofore, the cavitating venturi has been used successfully as a flow control valve because it exhibits a "choked" flow behavior for noncompressible fluids similar to that of the supersonic nozzle for compressible fluids. Both effects show flow rate saturation (constant flow) when the back pressure on the metering orifice is maintained above a certain level. This phenomenon that produces a constant flow with variations in back pressure has been found to be advantageous in applications where it is necessary to decouple (isolate) the fluid-consuming load from the supply system. With the cavitating venturi, variations in the pressure drop of the load will not affect the fluid mass flow into the load.

In addition to fixed flow cavitating venturi controls, the cavitating flow phenomenon has also been incorporated into variable area metering valves. Such a valve meters between a metering plug and a valve seat assembly having a geometry that in cross section resembles a venturi. These valves have been found to be particularly useful for rocket engines on space exploration vehicles. In rocket engine applications, and in most applications of variable area venturi metering valves, space is at a premium and the flow path tends to be somewhat tortuous. This results in turbulent flow through the metering section of the valve. Such turbulent flow reduces the valve efficiency, but, more importantly, prevents accurate knowledge of at what flow rate a particular valve will operate in the cavitating mode.

An object of this invention is to provide a venturi valve having predictable "choked" flow behavior. Another object of this invention is to provide a venturi valve having substantially nonturbulent flow through the metering area. Still another object of this invention is to provide a venturi valve having increased pressure efficiencies. A still further object of this invention is to provide a venturi valve having a flow straightener upstream of the metering area.

In accordance with the objects of this invention, a cavitating venturi valve includes a diffuser in the plenum chamber of a housing; the housing having an inlet passage and an outlet passage. The diffuser is located between the inlet passage and the outlet passage and includes a valve seat. A metering plug is adjustably mounted in the plenum chamber to form a variable metering area with the valve seat. This plug is shaped to form a cavitating flow pattern through the diffuser and controls the rate of flow by a change in spacing between the metering plug and the valve seat. To provide predictable cavitating flow behavior through the valve, a flow collimator (flow straigtener) is positioned in the plenum chamber upstream of the diffuser. The collimator develops a less turbulent flow pattern for a fluid passing through the diffuser.

In accordance with another aspect of this invention, a cavitating venturi valve includes a housing having an inlet passage and an outlet passage communicating with a plenum chamber. A cylindrical-shaped diffuser with a substantially straight wall bore is mounted in the plenum chamber between the inlet passage and the outlet passage. This diffuser includes a valve seat toward the upstream end. Forming a variable metering area with the valve seat is a metering plug having a geometry that will form a cavitating flow pattern through the straight wall bore diffuser. By adjusting the spacing between the metering plug and the valve seat, the rate of flow through the valve is controlled. A flow collimator, in the form of a plurality of parallel passageways, is positioned in the plenum chamber upstream of the diffuser to collimate the flow of fluid from the inlet passage through the diffuser.

A more complete understanding of the invention and its advantages will be apparent from the specifications and claims and from the accompanying drawings illustrative of the invention.

Referring to the drawings.

Figure 1:
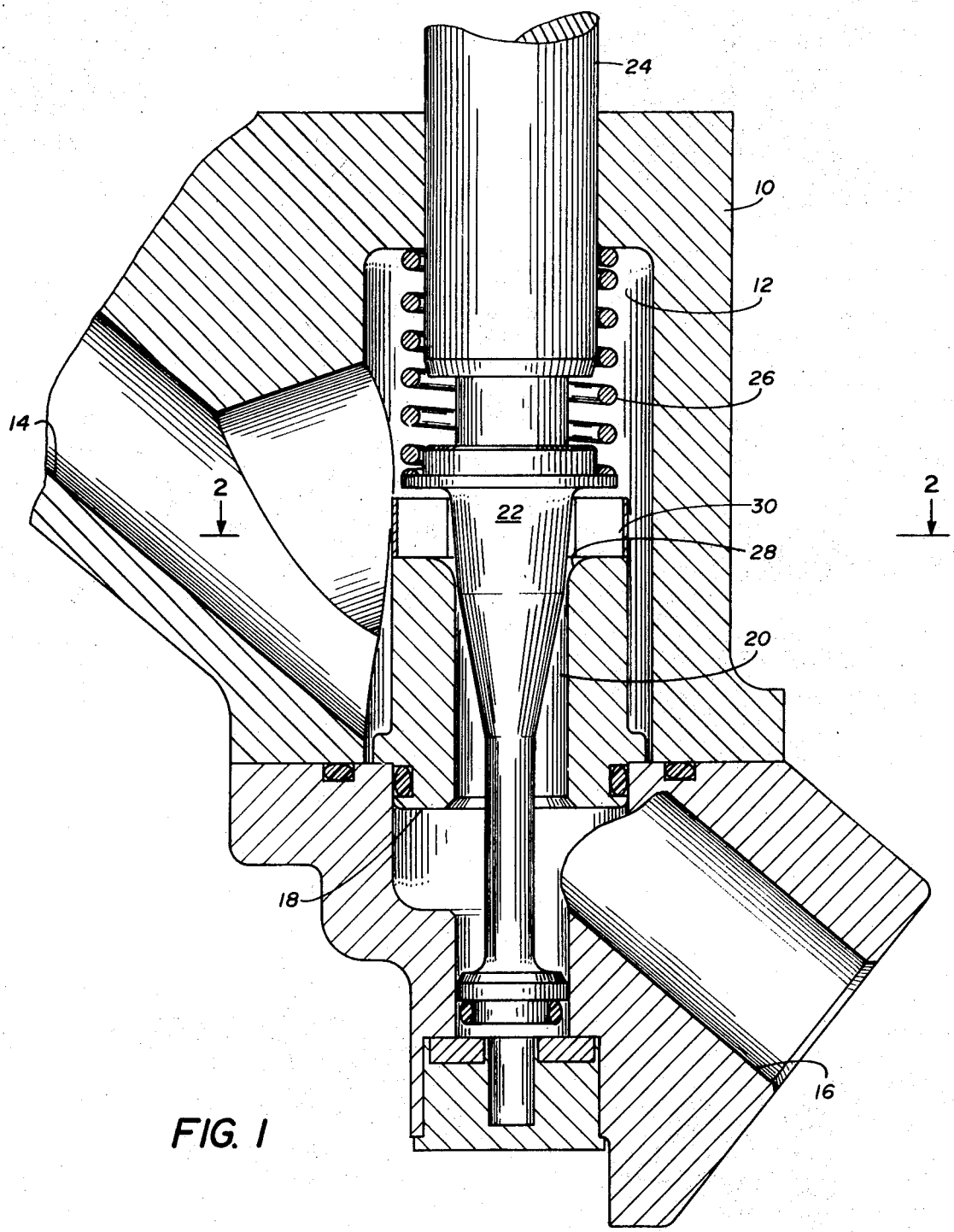
FIG. 1 is a sectional view of a cavitating venturi valve including a flow collimator (straightener) in accordance with the present invention.
Figure 2:
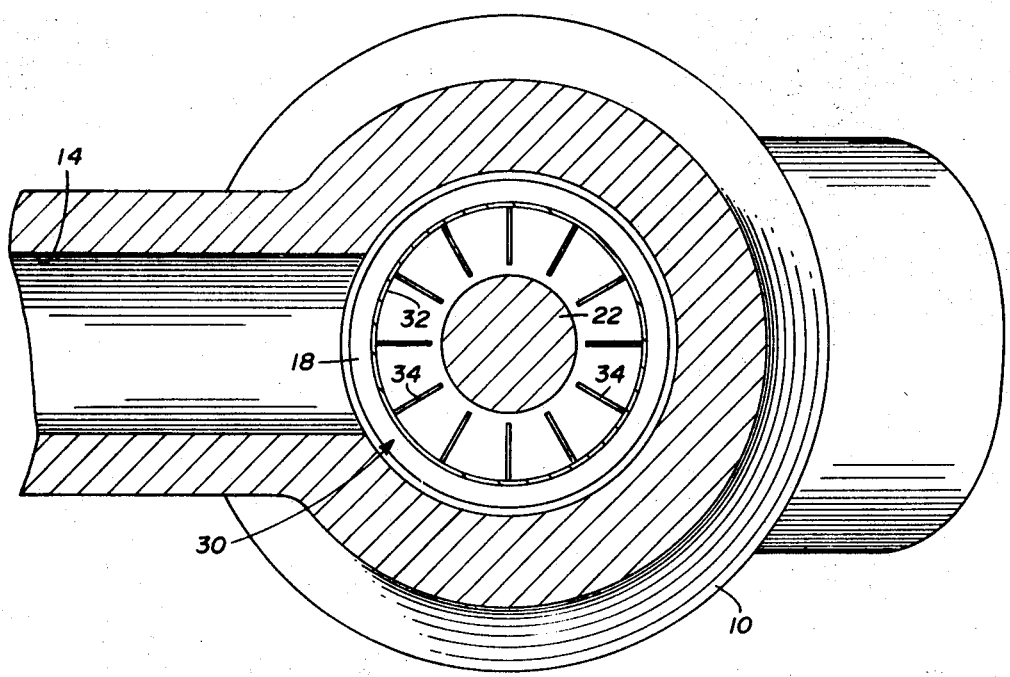
FIG. 2 is a cross section of FIG. 1 taken along the line 2—2.

Referring to FIGS. 1 and 2, there is shown a variable area venturi metering valve wherein the inlet and outlet flow directions are at an angle with respect to the metering flow direction. In the valve shown, a housing 10 includes a plenum chamber 12 having an inlet passage 14 communicating therewith on one side and an outlet passage 16 communicating therewith on the opposite side. Within the chamber 12 is a diffuser 18 having a substantially straight bore cylinder section 20 forming a conduit between the inlet passage side and the outlet passage side of the plenum chamber.

A metering plug 22 at the end of a positioning rod 24 is slidably positioned within the chamber 12 and moves coaxial with the straight bore cylinder section 20 of the diffuser 18. The metering plug 22 is positioned by means of a servomotor mechanism (not shown) coupled to the positioning rod 24. A spring 26 biases the metering plug 22 into contact with a valve seat 28 formed at the upstream end of the diffuser 18. As illustrated, the metering plug 22 closes off the fluid flow path between the inlet passage 14 and the outlet passage 16.

In the embodiment shown, the metering plug 22 has a generally conical configuration tapering toward the direction of flow. With the straight bore cylinder diffuser 18 and the conical-shaped metering plug 22, there results a venturi geometry that is capable of producing a cavitating flow pattern.

Fluid entering the plenum chamber 12 through the inlet passage 14 will flow in a turbulent pattern. This turbulent flow adversely affects the cavitating venturi valving of the metering plug 22 and the diffuser 18, as will be explained in FIG. 3. To produce a less turbulent pattern through the diffuser 18, a flow collimator 30 is mounted in the plenum chamber 12 upstream of the diffuser 18. As shown in FIG. 2, the collimator 30 includes an outer ring 32 with a plurality of inwardly extending radial fins 34 secured thereto. The fins 34 form a plurality of parallel passageways between the upstream section of the plenum chamber 12 and the diffuser 18. The fins 34 are evenly distributed circumferentially and form passageways having a sufficient total flow capacity to provide the required maximum flow of liquid through the diffuser 18. Dimensionally, the fins 34 have a ratio of length in the direction of flow to width in the direction transverse to flow sufficient to collimate a stream of fluid as it passes from the inlet passage 14 to the outlet passage 16. The length in the fins in the direction of flow is typically on the order of two or three times the distance between adjacent fins. An additional design criterion is that the fins have a width in a direction transverse to flow such that the ratio of the diameter of the plenum chamber 12 to the fin width is on the order of 4 to 1.

As an aid in understanding the operation of a cavitating venturi valve, an explanation of the phenomenon of cavitation is presented. When a noncompressible fluid undergoes a contraction and an expansion through a venturi-type section, the pressure is reduced at the minimum contraction section as the fluid velocity increases according to Bernoulli's equation and the equation of continuity as follows:

$$P_1 + \tfrac{1}{2}\rho V_1^2 = P_2 + \tfrac{1}{2}\rho V_2^2 = P_3 + \tfrac{1}{2}\rho V_3^2;$$
$$A_1 V_1^2 = A_2 V_2^2 = A_3 V_3^2$$

where $P_1$, $V_1$ and $A_1$ are the pressure, volume and area of the upstream section of the venturi, $P_2$, $V_2$ and $A_2$ are the pressure, volume and area of the venturi throat, and $P_3$, $V_3$ and $A_3$ are the pressure, volume and area of the downstream section of a venturi. The above relationship, however, is no longer true when the minimum pressure reaches the vapor pressure ($P_v$) of the fluid, i.e., $P_2=P_v$. When the vapor pressure is reached, the pressure at the venturi can be reduced no further and the flow remains constant. After passing through the venturi throat the pressure is regained through the diffuser 18 to the downstream pressure $P_3$.

The pressure drop across the illustrated valve versus flow rate varies with the load application. The valve pressure drop necessary to drop the total supply pressure at the inlet passage 14 to that required by a load connected to the outlet passage 16 is obtained by subtracting the required load pressure drop from the supply pressure. The valve pressure drop turns out to be a function of the load requirements. For a cavitating valve, the pressure schedule (valve pressure drop) should be such that the valve always operates in a region of cavitation. The maximum pressure recovery permissible for a cavitating valve is a ratio of the maximum back pressure to the supply pressure when the valve is at the point of incipient cavitation.

Figure 3:
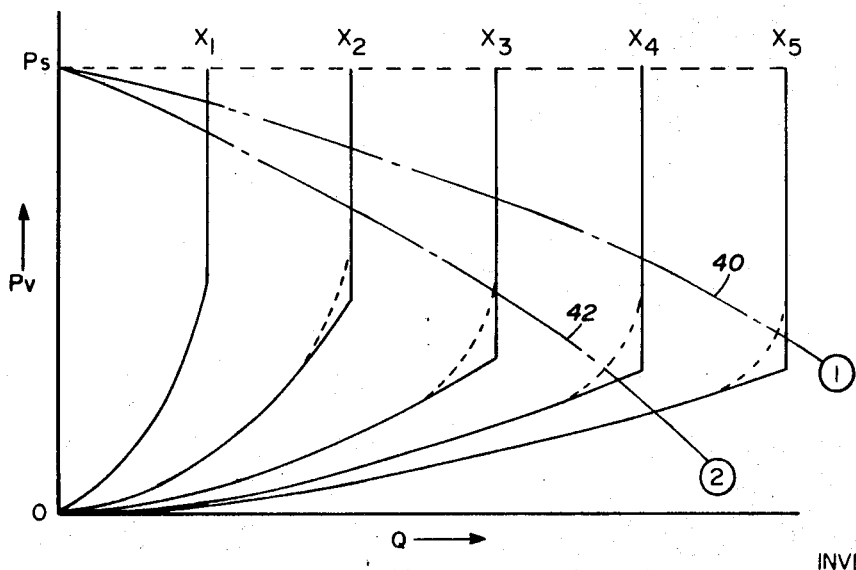
FIG. 3 is a plot of the pressure drop across a cavitating variable area venturi valve versus the flow rate through the valve for different metering plug positions.

Referring to FIG. 3, there is shown pressure drop across a typical valve versus the flow rate through the valve with varying back pressure, that is, load pressure. Starting from a zero pressure drop across the valve, the flow rate proceeds along a square law curve until the point of incipient cavitation, then the flow rate is constant even though the pressure drop across the valve changes. The family of curves of FIG. 3 shows the characteristics of a valve for different positions ($x_1, x_2, \ldots x_5$) of the metering plug 22.

Figure 4:
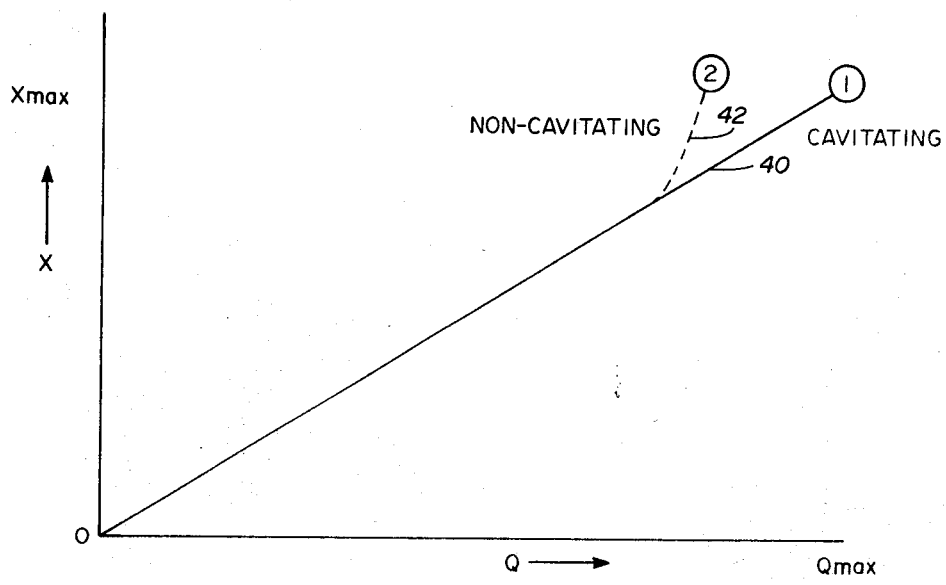
FIG. 4 is a plot of the metering plug position of a variable area venturi valve versus flow rate through the valve.

With a specified pressure drop versus flow rate schedule, the flow rate versus plug stroke can be plotted as shown in FIG. 4. It will be noted in FIG. 3, that the shaped plug has linear flow versus stroke characteristics as long as the pressure schedule, line 40, crosses the flow versus pressure drop family of curves in the cavitation region, but changes to a lower flow-stroke gain when the pressure schedule, line 42, crosses the square law curves. Thus, the pressure schedule of a valve should be such that operation is always in the cavitation mode.

Without the flow straightener 30, the transition from the noncavitating mode of operation to the cavitating mode is unstable. That is, the corner at which the flow changes from the noncavitating to the cavitating pattern varies with flow rate and is not predictable, as illustrated by the dotted lines of FIG. 3 for each metering plug position. The flow straightener isolates the flow at the valve seat 28 from upstream turbulence and the change into the cavitating mode becomes predictable and repeatable.

To cause the valve to cavitate, the passage downstream of the metering orifice, i.e., the valve seat 28, must be an efficient diffuser. One of the most efficient diffusers for a variable metering area valve, as illustrated in FIG. 1, is a straight bore cylinder. The diameter of the valve seat 28, and thus the diameter of the diffuser channel 20, is determined by the stroke of the metering plug 22 and the taper of the conical section of the plug. It has been shown, that efficient angles for the cone-shaped plug are between 4° and 10°.

In a model of a cavitating venturi valve in accordance with the present invention, the valve seat 28 was configured as having a 0.5-inch short radius, i.e., short of a full radius by about 20°. The angles of the cone of the metering plug 22 varied from 4° to 10° to obtain the correct linear flow versus plug displacement relationship. A plug stroke of 0.25 inches was used with a seat diameter of 0.434 inches. The diffuser 18 had a substantially straight bore configuration.

Figure 5:
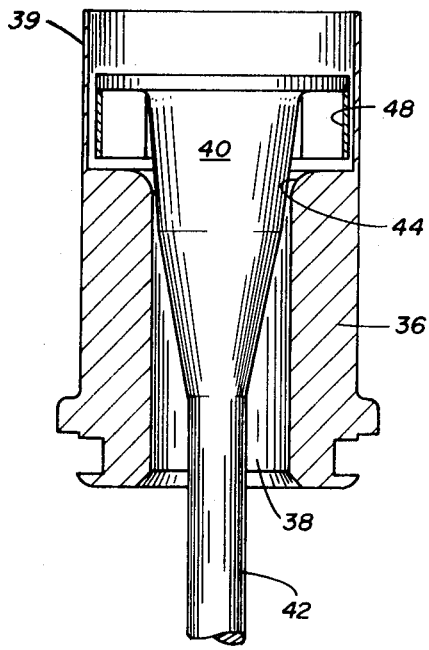
FIG. 5 is a cross section of a metering plug and diffuser assembly illustrating an alternate embodiment of a flow straightener.
Figure 6:
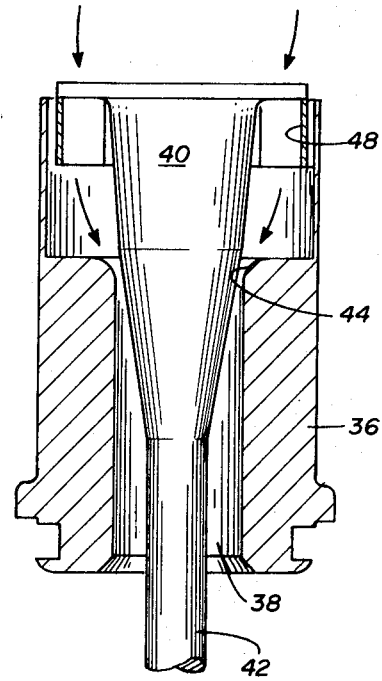
FIG. 6 is a cross section of the embodiment of FIG. 5 illustrating the position of the metering plug and flow straightener for maximum valve flow.

An alternate embodiment of the venturi valve is illustrated in FIGS. 5 and 6, only the metering assembly is illustrated.

Referring to FIG. 5, a diffuser 36 having a substantially straight wall cylindrical bore 38 and a flow-straightening cylinder 39 is mounted between the inlet passage side and the outlet passage side of a plenum chamber. A metering plug 40, having a generally conical section tapering into a shaft 42, forms a metering valve with the diffuser 36. To change the rate of flow through the valve, the spacing between the plug 40 and a valve seat 44 of the 36 is varied. In FIG. 5, the metering plug 40 is shown at about 10 percent flow rate position.

Mounted to the top section of the plug 40 is a flow straightener 48 consisting of a circular collar with a plurality of circumferentially spaced radially outwardly extending fins. These fins from a plurality of parallel passageways between the turbulent upstream flow and the diffuser 36. With the embodiment of FIGS. 5 and 6, the flow straightener 48 moves with the metering plug 40 within the cylinder 39. In FIG. 6, the metering plug is shown in the 100 percent flow position with the flow straightener 48 displaced from the diffuser 36.

While several embodiments of the invention, together with modifications thereof, have been described in detail herein and shown in the accompanying drawings, it will be evident that various further modifications are possible without departing from the scope of the invention.

What is claimed is:

1. In a cavitating venturi valve comprising:
   a housing having an inlet passage and an outlet passage communicating with a plenum chamber,
   a cylindrically shaped diffuser with substantially straight wall sections in said chamber between the inlet passage and the outlet passage and including a valve seat toward the upstream end,
   a metering plug in said chamber having a tapered first section for mating with the valve seat to shut off a flow from the inlet passage to the outlet passage and a cone-shaped second section contiguous with the first section converging from the first section in the direction of fluid flow to form a venturi with said cylindrical-shaped diffuser to produce a cavitating flow pattern through said diffuser for controlling the rate of flow through said valve by a change in the spacing between said plug and the valve seat, and
   a flow collimator in said chamber between the inlet passage and said diffuser to develop a nonturbulent flow for a fluid passing through said diffuser.

2. A cavitating venturi valve as set forth in claim 1 wherein said housing has the inlet passage communicating with the plenum chamber at an angle less than 90° to the flow through said diffuser.

3. A cavitating venturi valve as set forth in claim 2 wherein said housing has the outlet passage communicating with the plenum chamber at an angle greater than 90° to the flow through said diffuser.

4. A cavitating venturi valve as set forth in claim 3 wherein said flow collimator includes a plurality of parallel passageways in said chamber having a ratio of length, in the direction of fluid flow, to width, in a direction transverse to fluid flow, sufficient to collimate the flow of fluid from the inlet passage through said cylinder.

5. A cavitating venturi valve as set forth in claim 3 wherein said flow collimator includes a cylindrical collar having a plurality of circumferentially spaced fins extending radially attached thereto to collimate a flow of fluid from the inlet passage through said straight bore cylinder.

6. A cavitating venturi throttling valve as set forth in claim 3 wherein said flow collimator includes a collar mounted to said metering plug, said collar having a plurality of circumferentially spaced fins extending radially therefrom and attached thereto to collimate a flow of fluid from the inlet passage through said straight bore cylinder.

* * * * *